UNITED STATES PATENT OFFICE.

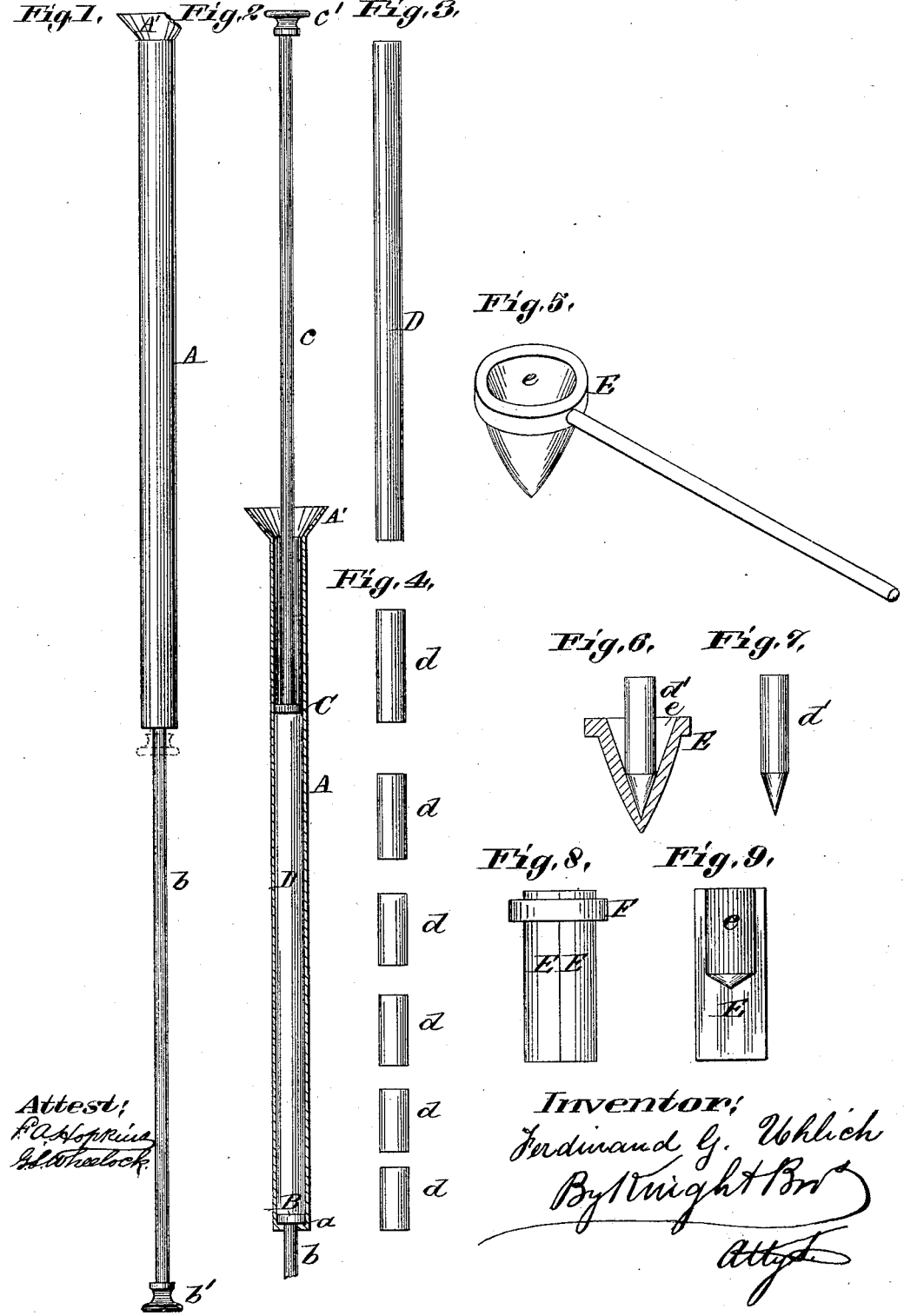

FERDINAND G. UHLICH, OF ST. LOUIS, MISSOURI.

SUPPOSITORY-MACHINE.

SPECIFICATION forming part of Letters Patent No. 342,236, dated May 18, 1886.

Application filed January 12, 1886. Serial No. 183,231. (No model.)

*To all whom it may concern:*

Be it known that I, FERDINAND G. UHLICH, of the city of St. Louis, in the State of Missouri, have invented a certain new and useful Improvement in Apparatuses for Making Suppositories, of which the following is a full, clear, and exact description, reference being had to the accompanying drawings, forming part of this specification, and in which—

Figure 1 is a side view of the cylinder and the discharge-piston. Fig. 2 is an axial section of the cylinder and the two pistons. Fig. 3 is a side view of the cylindrical body, which is cut into lengths, as shown in Fig. 4, each of which is pointed by the instrument of which a perspective view is shown in Fig. 5, the operation being illustrated by the sectional view shown in Fig. 6. Fig. 7 shows one of the suppositories completed. Fig. 8 is a side view of a modification of the instrument shown in Fig. 5, the same consisting of duplicate parts, as seen in Fig. 9, held together by a band or ring.

A is a cylinder, open at one end, and having at the other end a head, $a$, which is bored for the passage of the rod $b$ of a piston, B. The piston-rod has a knob, $b'$, by which it is held.

A' is the flaring mouth of the cylinder A. This flaring mouth is not essential; but it is advantageous, as increasing the facility with which the material is put into the cylinder.

C is a removable piston, having a rod, $c$, and a knob, $c'$. The piston C is used for the compression of the material in the cylinder A.

When the material D is placed in the cylinder, it is in a soft condition, so that it is readily compressed into a dense mass. The temperature is then reduced to give firmness or hardness to the mass. This may be done in any manner—for instance, by the immersion of the cylinder in cold water. Then the stick or cylinder D is forced from the cylinder A by means of the piston B. The cylindrical mass D is then cut into pieces, $d$, of proper length.

E is a metal thimble, having a recess, $e$, of the proper form to give the required shape to the end of the suppository $d'$, whatever the diameter of the piece $d$ may be. Thus the same thimble may be used for a number of cylinders A of various sizes.

In the use of the thimble it is first heated, and then the end of the piece $d$ is inserted in the thimble and pressed down. It may be turned within the thimble to assist the operation.

In the modification shown in Figs. 8 and 9 the thimble is made in two parts, E E, which are held together when in use by a ring or collar, F. (See Fig. 8.) In this case the recess $e$ is cylindrical in its outer part and conical at the point. The two parts E may be taken apart to remove the suppository.

I claim as my invention—

In a machine for making suppositories, the combination, with the cylinder A and the removable piston C for compressing the material therein, of the ejector, consisting of the piston B and the rod $b$, of the requisite length for expelling the material from the filling end of the cylinder, substantially as set forth.

FERDINAND G. UHLICH.

Witnesses:
SAML. KNIGHT,
GEO. H. KNIGHT.